April 20, 1943. W. E. DAILEY 2,317,136
SPRING WHEEL
Filed June 17, 1942
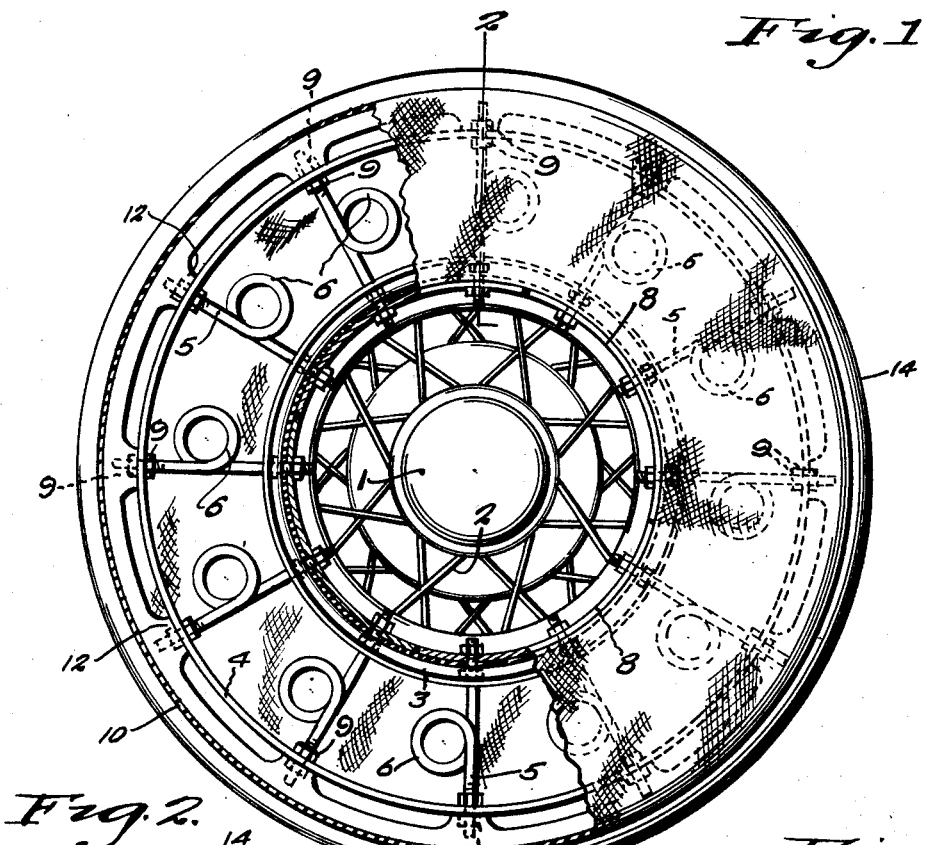
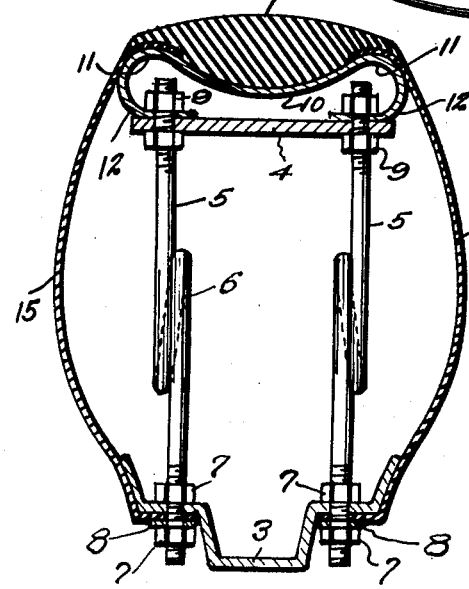
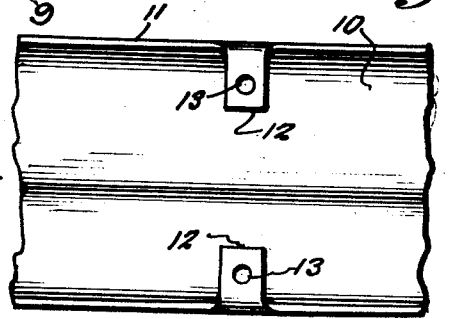
Inventor
William E. Dailey
By Clarence A. O'Brien
and Harvey B. Jackson
Attorneys Patented Apr. 20, 1943

2,317,136

UNITED STATES PATENT OFFICE 2,317,136

SPRING WHEEL

William E. Dailey, Chicago, Ill.

Application June 17, 1942, Serial No. 447,411

2 Claims. (Cl. 152—261)

My invention relates to improvements in spring wheels for vehicles, more particularly automobiles, the principal object in view being to provide a simply constructed, resilient wheel to take the place of the usual automobile wheel and pneumatic tire without sacrificing resiliency, traction or other advantages of pneumatic tire wheels.

Other and subordinate objects are also comprehended by my invention, all of which, together with the precise nature of my improvements, will be readily understood when the succeeding description and claims are read with reference to the drawing accompanying and forming part of this specification.

In said drawing:

Figure 1 is a view in side elevation, partly broken away, of a spring wheel constructed in accordance with my invention.

Figure 2 is a fragmentary view in transverse section taken on the line 2—2 of Figure 1 and drawn to an enlarged scale, and Figure 3 is a fragmentary view in bottom plan of the tire carrying rim.

Referring to the drawing by numerals, my improved wheel has been illustrated therein, by way of exemplifying a preferred embodiment thereof, as comprising the usual hub 1, spokes 2, and rim 3 of the conventional wire spoke automobile wheel of commerce.

According to my invention, a transversely flat, relatively large felly 4 of metal is provided around the rim 3 in spaced concentric relation thereto. Upon each side of the circumferential center of the rim 3 and felly 4 is a series of circumferentially spaced, radial, auxiliary spokes 5 of rod-like resilient metal formed intermediate their ends into a single convolution coil 6, said spokes 5 being equi-distantly spaced around the rim 3 and felly 4 upon each side of the median plane thereof. The auxiliary spokes 5 may be opposed in pairs, as shown, or otherwise arranged. Nuts 7 threaded onto the inner ends of the auxiliary spokes 5, with the usual washers 8, and the nuts opposed to opposite faces of the rim 3, secure said auxiliary spokes to said rim 3. Nuts 9 arranged similarly about the felly 4 secure the outer ends of the auxiliary spokes 5 to said felly, said outer ends of said spokes 5 being extended through the felly 4, as shown in Figure 2.

Surrounding the felly 4 is a tire carrying rim 10 of metal, preferably resilient, and concave transversely in the arc of a circle with rounded side edges 11 and inwardly turned hook-like side edge lugs 12 apertured, as at 13, and fitting over the outer ends of the auxiliary spokes 5 for clamping against the felly 4 by appropriate nuts 9 so that said tire engaging rim 4 is spaced, with the exception of the lugs 12, from the felly 4.

A solid rubber tire 14 is suitably secured on said rim 10, as by cement not shown, the inner circumference of said tire conforming transversely to the shape of the rim. The outer circumference, or tread, of the tire 14 is formed transversely in a long arc. As will be seen, such a tire requires a minimum of rubber.

A pair of annular, side wall members 15, of suitable flexible material, are provided to bridge the space between the rims 3 and 10, the outer edges of said members being suitably secured between the side edges of the rim 10 and the tire 14, as by cementing not shown. The inner edges of the members 15 are turned inwardly around the side edges of the rim 3 and the inner ends of the auxiliary spokes 5 are suitably extended through said edges which are clamped to the inner face of the rim 3 by the appropriate nuts 7.

As will now be seen, the load on the described wheel is, in effect, spring suspended from the top thereof, and the tire 14, rim 10 and spokes 5 support the load so that maximum resiliency is obtained in my improved wheel without sacrificing strength, either as regards load carrying capacity or stability offsetting side sway. As will also be manifest, the side wall members 15, together with the tire 14, impart to the wheel the semblance of the usual pneumatic tire. As will be understood, the number of auxiliary spokes 5 may be diminished or increased according to the type of wheel desired, that is, whether for light or heavy duty, and the parts of the wheel may be readily disassembled for replacement purposes or repairs.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the subjoined claims.

What I claim is:

1. A vehicle wheel comprising an inner annular band, a transversely flat felly surrounding said band and spaced therefrom, resilient spokes at each edge of the band and felly having threaded ends extending through said edges, pairs of clamping nuts on said ends of the spokes clamping the band and felly therebetween, a transversely dished one-piece tire supporting rim surrounding said felly and spaced therefrom, edge ears on said rim bent inwardly therefrom and secured flat against the outer side of the felly by said bolts and nuts thereon, said ears spacing the rim from the felly, and a solid tire of substantially oval form transversely fitting in said dished rim.

2. A vehicle wheel comprising an inner annular band, a transversely flat felly surrounding said band and spaced therefrom, resilient spokes at each edge of the band and felly having threaded ends extending through said edges, pairs of clamping nuts on said ends of the spokes clamping the band and felly therebetween, a transversely dished one-piece tire supporting rim surrounding said felly and spaced therefrom, edge ears on said rim bent inwardly therefrom and secured flat against the outer side of the felly by said bolts and nuts thereon, said ears spacing the rim from the felly, a solid tire of substantially oval form transversely fitting in said dished rim, and a pair of annular cover members of flexible material for closing the space between the inner band and the tire supporting rim and having inner edges secured to the band by said bolts and nuts thereon and outer edges anchored between the tire and rim at the sides thereof.

WILLIAM E. DAILEY.